INVENTORS.
Kurt E. Voderberg,
Theodore R. Lang,
By Brown, Jackson,
Boettcher & Dienner
Attys.

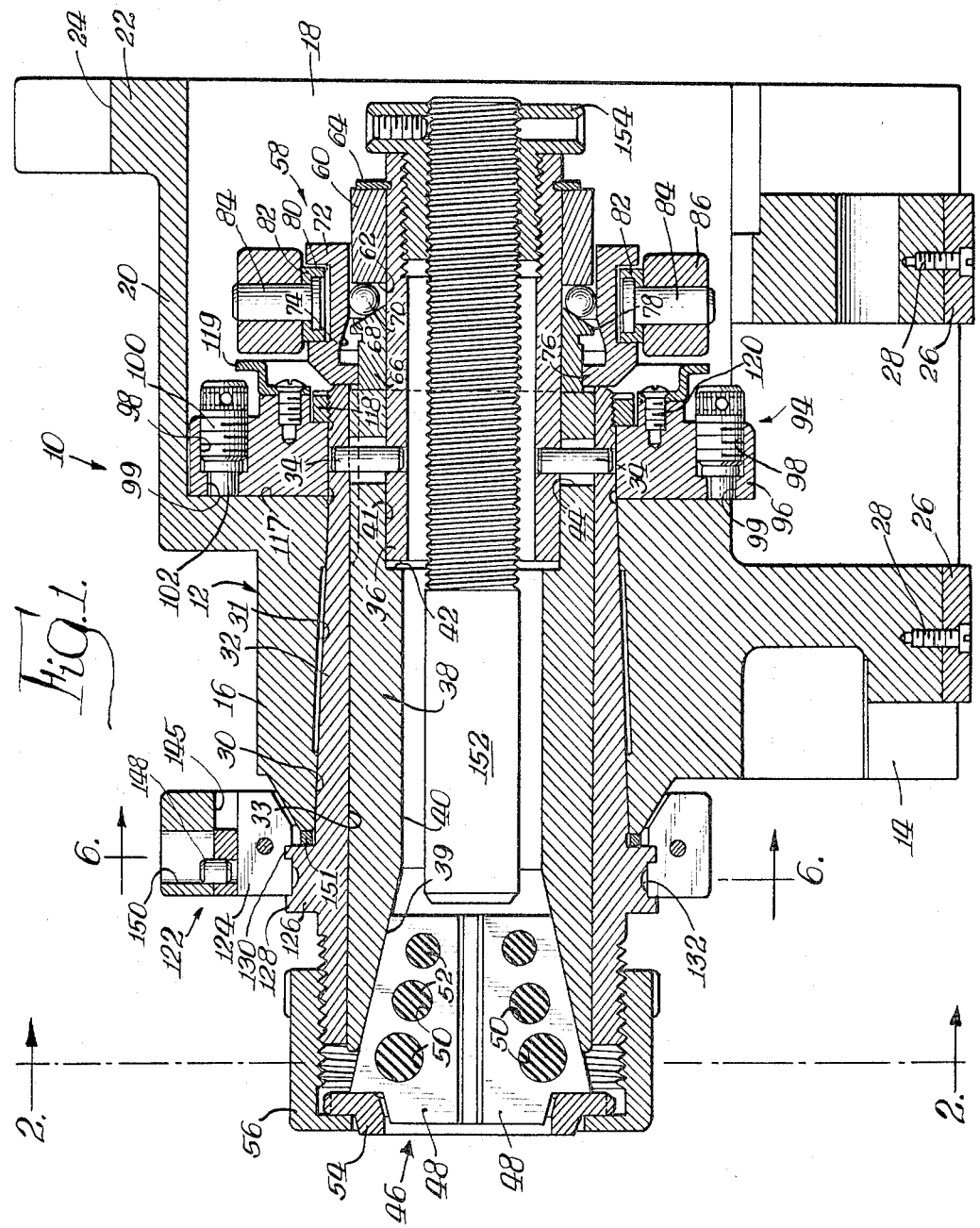

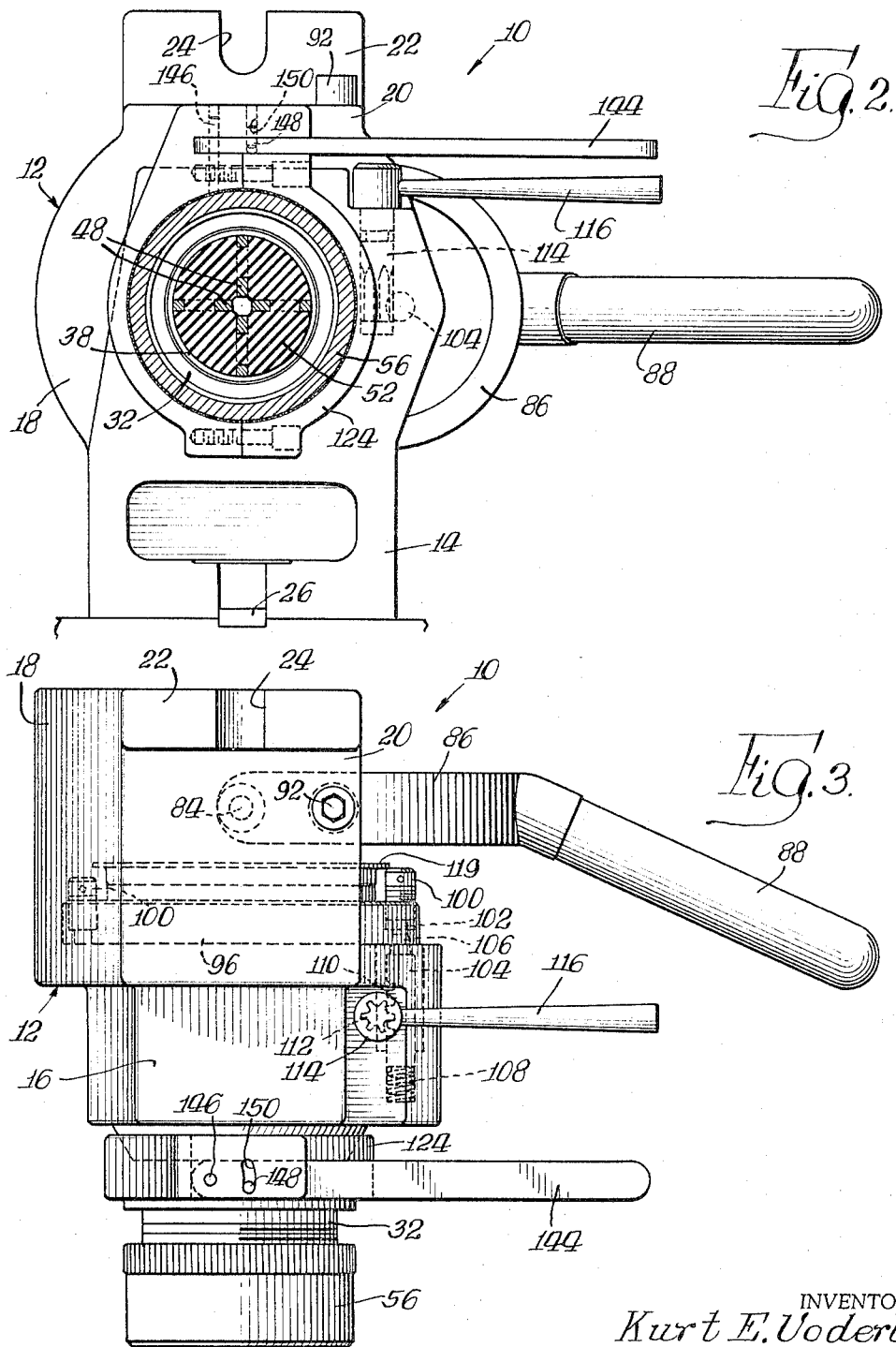

United States Patent Office 3,273,907
Patented Sept. 20, 1966

3,273,907
FIXTURE
Kurt E. Voderberg, 531 Lake Ave., Wilmette, Ill., and Theodore R. Lang, 6312 N. Monticello, Chicago, Ill.
Filed Mar. 2, 1964, Ser. No. 348,657
4 Claims. (Cl. 279—5)

Our present invention relates generally to a fixture and more particularly to a work holding fixture adapted for use with machine tools, such as a milling machine or a drill press, for supporting and accurately locating a workpiece relative to a cutting tool.

It is an object of our present invention to provide a work holding fixture wherein the work holding device of the fixture is actuated by moving a member axially relative to the work holding device.

Our fixture incorporates work holding means comprising a hollow carrier member or outer spindle, an inner spindle axially slidable in the outer spindle, a work holding device positioned in the inner spindle at one end thereof, and means on the outer spindle at one end thereof and engaging the work holding device for preventing axial movement of the latter in one direction. Movement of the inner spindle axially relative to the work holding device effects actuation of the latter to clamp a workpiece therein.

It is another object of our present invention to provide a work holding fixture, as described, wherein means are provided for selectively effecting axial movement of the inner spindle in one direction to close the work holding device and for selectively permitting axial movement of the inner spindle in the other direction to open the work holding device.

It is a further object of our present invention to provide a work holding fixture, as described, wherein indexing and locating means are provided for locking the outer spindle and associated structure against rotational movement in any indexed position.

It is a still further object of our present invention to provide a work holding fixture, as described, wherein manually operable means are provided for rotating the outer spindle when the indexing and locating means is unlocked.

Now in order to acquaint those skilled in the art with the manner of constructing and using fixtures in accordance with the principles of our present invention, we shall describe in connection with the accompanying drawings a preferred embodiment of our invention.

In the drawings:

FIGURE 1 is a vertical median longitudinal sectional view of the fixture of our present invention, with certain of the elements thereof being shown in one operative position;

FIGURE 2 is a transverse view on a reduced scale, partly in section and partly in elevation, of the fixture of FIGURE 1, taken substantially along the line 2—2 in FIGURE 1, looking in the direction indicated by the arrows;

FIGURE 3 is a plan view, on a reduced scale, of the fixture of FIGURE 1;

Figure 4:
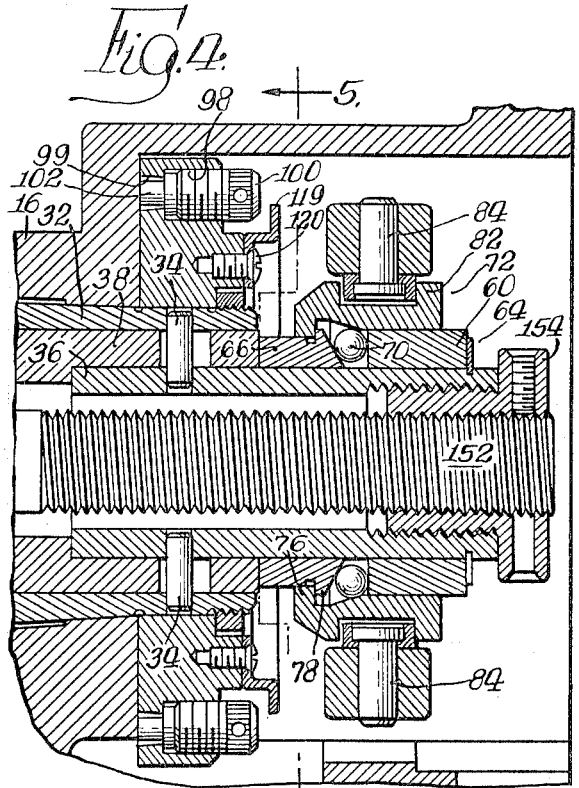
FIGURE 4 is a fragmentary vertical median longitudinal sectional view of the rear end portion of the fixture of FIGURE 1, with certain of the elements thereof being shown in a second operative position.

Referring now to FIGURES 1–3, there is indicated generally by the reference numeral 10 the work holding fixture of our present invention, which is adapted for use with machine tools, such as a milling machine or a drill press, for supporting and accurately locating a workpiece relative to a cutting tool. The fixture 10 is comprised of a housing 12 having a base portion 14, a forward main body portion 16, a rear side wall portion 18, and a rear upper wall portion 20. The rear wall portion 20 is provided with a flange 22 having a notch 24 therein. The bottom plane surface of the base portion 14 is ground smooth so that the fixture may be accurately seated in a horizontal position (as shown) upon the work table of a machine tool. The rear plane surface of the base portion 14, the side wall portion 18, the upper wall portion 20, and the flange 22, is also ground smooth, at a right angle to the bottom plane surface of the base portion 14, so that the fixture alternatively may be accurately seated in a vertical position (not shown) upon the work table of a machine tool. If desired, a pair of keys 26 may be secured, as by bolts 28, to the underside of the base 14, with the keys 26 being adapted to be received in guideways in the work table to which the fixture is attached for locating the latter. When the housing 12 is to be disposed in a vertical position, suitable fastening means (not shown) may be disposed through the notch 24 for securely fastening the housing to the work table.

The main body portion 16 of the housing 12 is formed with a longitudinal bore 30 therethrough which slightly tapers inwardly in a rearward direction and which may be recessed as at 31. Rotatably mounted within the bore 30 is a hollow carrier member or outer spindle 32 which extends through and outwardly beyond both ends of the bore 30. The outer spindle 32 has an exterior intermediate tapered surface corresponding to the taper of the bore 30, and is provided with a straight bore 33 therethrough. Secured in openings formed in the outer spindle 32, adjacent the rear end thereof, are the outer ends of a plurality of radially extending pin members 34, which number four in the specific embodiment of the invention herein disclosed. Extending into the rear end of the outer spindle 32 coaxially thereof is the forward portion of a sleeve member 36. The sleeve member 36 has its outer periphery spaced radially inwardly of the bore 33 of the spindle 32, and is provided with suitable openings in which are secured the inner ends of the pin members 34. By reason of this construction, the sleeve member 36 is attached to and rotatable with the outer spindle 32.

Mounted for axial sliding movement within the bore 33 of the outer spindle 32 is a hollow inner spindle 38 that is substantially coextensive in length with the spindle 32. The spindle 38 has a forward outwardly extending conical opening or inner surface 39, an intermediate bore 40 and a rear bore 41, with the junction of the bores 40 and 41 serving to define a shoulder 42. The bore 41 in the inner spindle 38 receives and provides a bearing support for the forward portion of the sleeve member 36.

The inner spindle 38 is also provided with a plurality of radial slots 44 adjacent the rear end thereof through which extend the pin members 34 that secure together the outer spindle 32 and the sleeve member 36. The sides of the slots 44 engage the pin members 34 whereby the inner spindle is caused to rotate conjointly with the outer spindle 32, but the ends of the slots 44 are spaced from the pin members 34 so as to permit axial movement of the inner spindle 38 relative to the outer spindle 32 and the sleeve member 36.

The forward end of the inner spindle 38 is arranged to receive a work holding device in the form of a collet 46. The collet 46 is comprised of a plurality of circumferentially spaced radial jaw members 48 having outer tapered edges that cooperatively interengage the conical inner surface 39 of the inner spindle 38. The jaw members 48 are provided with transverse apertures 50 and are embedded in a body of resilient material 52 which serves to retain the jaw members 48 in circumferentially spaced relation and yet permits limited radial movement of the jaw members 48. The inner edges of the jaw members 48 are spaced apart in parallel relation whereby to provide work gripping bearing surfaces coaxial of the spindle 38. A workpiece is gripped within the collet 46 by applying a radial force to urge the jaw members 48 radially inwardly, and the workpiece is thereafter released from the collet 46 by withdrawing the radial force and permitting the resilient body 52 to bias the jaw members 48 radially outwardly to open the same as will be described in greater detail hereinafter. Although a collet 46 having four jaw members 48 is shown in the drawings, it will be appreciated that collets of corresponding construction but having a different number of jaw members may be used in connection with our present invention. Normally, the number of jaw members will vary in accordance with the capacity of the collet.

After a collet 46 has been disposed within the forward end of the inner spindle 38, the collet 46 is retained against forward axial movement in a direction outwardly of the outer spindle 32 by means of an annular member 54 held in place by a collar member 56 threaded onto the forward end of the outer spindle 32. The collar member 56 is threaded on the outer spindle 32 a sufficient distance to slightly compress the resilient body 52 whereby to initially tighten the collet 46 within the inner spindle 38. Radial movement of the jaw members 48 for gripping and releasing workpieces is controlled through axial movement of the inner spindle 38.

The means for effecting forward axial movement, and for permitting rearward axial movement, of the inner spindle 38 is mounted on the rear portion of the sleeve member 36 and is indicated generally by the reference numeral 58. The spindle actuating means 58 comprises an annular rear retainer or abutment member 60 mounted on the sleeve member 36 adjacent the rear end thereof. The retainer member 60 is formed with a forward radial surface 62 that is perpendicular to the axis of the sleeve member 36, and is held against rearward axial movement by means of a snap ring 64 secured in the sleeve member 36. Slidably mounted on the sleeve member 36 intermediate of the rear end of the inner spindle 38 and the retainer member 60 is a forward annular retainer member 66 having a rear inclined surface 68. The forward end of the retainer member 66 normally abuts the rear end of the inner spindle 38, and arranged between the surfaces 62 and 68 of the retainer members 60 and 66 are a plurality of balls or rollers 70.

When the balls 70 are urged radially inwardly to the position shown in FIGURE 1, a forward horizontal force component acts on the inclined surface 68 of the forward retainer member 66 causing the latter and the inner spindle 38 to be moved axially forwardly. As the conical surface 39 of the inner spindle 38 moves axially forwardly relative to the jaw members 48 of the collet 46, an inward radial force component is imposed on the jaw members 48 thereby urging them radially inwardly to a work holding closed position. At the same time, the resilient body 52 is placed in compression. The force of expansion of the compressed resilient body 52, acting through the jaw members 48 on the conical surface 39 of the inner spindle 38, imposes a rearward horizontal force component on the inner spindle 38 and the forward retainer member 66 and a resultant outward radial force component on the balls 70. Under these conditions, when the balls 70 are permitted to move radially outwardly from the position shown in FIGURE 1, the forward retainer member 66 and the inner spindle 38 will move axially rearwardly. As the conical surface 39 of the inner spindle 38 moves axially rearwardly relative to the jaw members 48 the latter move radially outwardly to a work releasing open position.

Radial positioning of the balls 70 is controlled by means of an axially shiftable ring member 72 having an inner recessed annular pocket 74. When the ring member 72 is in the position shown in FIGURE 1, the balls 70 abut the inner cylindrical surface of the ring 72 and are disposed in their radially innermost positions whereby the collet 46 is closed. When the ring member 72 is moved axially rearwardly to the position shown in FIGURE 4, the balls 70 are partially received in the pocket 74 and are thus permitted to move to their radially outermost positions whereby the collet 46 is opened. The ring member 72 is provided with a forward annular radially inwardly directed flange portion 76. The main body of the ring 72 is slidably supported on the rear retainer 60 and the ring flange 76 is slidably supported on the forward retainer 66. The flange 76 is engageable with the rear end of the outer spindle 32 for limiting forward movement of the ring member 72 and is engageable with an annular radially outwardly directed flange portion 78 on the forward retainer member 66 for limiting rearward movement of the ring member 72. The elements of the shift means for the inner spindle 38 are so arranged that the forward retainer member 66 urges the rear end of the inner spindle 38 inwardly of the plane of the rear edge of the outer spindle 32 as the shift ring 72 is moved from its rearward to its forward position in order to prevent the ring flange 76 from engaging and acting directly on the rear end of the inner spindle 38. Thus, axial movement of the inner spindle 38 is exclusively governed by radial movement of the balls 70. The axial extent of the slots 44 in the inner spindle 38 is such that the ends thereof never engage or exert an axial force on the pin members 34. In this connection, the shoulder 42 in the inner spindle 38 is engageable with the forward edge of the sleeve member 36 to provide an absolute limit to rearward axial movement of the inner spindle 38, independent of the radial position of the balls 70.

Figure 7:
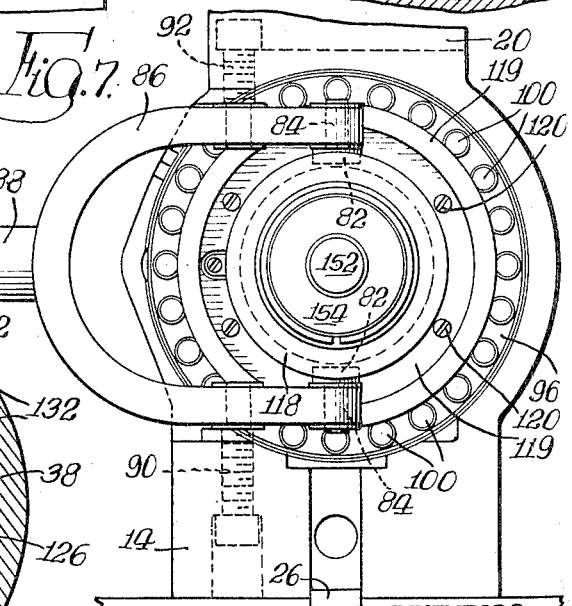
FIGURE 7 is a rear elevational view, on a reduced scale, of the fixture of FIGURE 1.

The ring member 72 is also formed with an intermediate external annular groove 80 which receives a pair of diametrically opposed rollers 82 journaled on the inner ends of radial pin members 84. As best shown in FIGURE 7, the pins 84 are carried at the ends of the yoke portion 86 of an operating handle 88. The yoke portion 86 of the handle 88 is in turn pivotally mounted on the inner ends of bolt members 90 and 92 threaded into suitable openings formed respectively in the base portion 14 and the upper wall portion 20 of the housing 12. Pivotal movement of the handle 88 about the common axis of the bolt members 90 and 92 effects axial movement of the ring member 72 between the positions shown in FIGURES 1 and 4. The rollers 82 riding in the groove 80 of the ring member 72 serve as a floating connection between the handle yoke 86 and the ring member 72.

Indexing and locating means indicated generally by the reference numeral 94 is also provided for angularly positioning, and locking against rotational movement in any indexed position, the outer spindle 32 and related structure, including the collet 46. The indexing and locating means 94 comprises an indexing plate 96 suitably keyed or otherwise secured to the outer spindle 32 at the rear end thereof. The indexing ring 96 is formed with a plurality of circumferentially spaced axial threaded openings 98 and coaxial apertures 99. In the specific embodiment of our invention herein disclosed, twenty-four indexing openings 98 are provided. However, the number of indexing openings 98 may be increased or decreased to meet particular indexing requirements. Threaded into the openings 98 are screws 100 which have forward nose portions 102 that are adapted to be disposed in blocking relation in the apertures 99. When the screws 100 are threaded to the positions shown in FIGURE 1, the apertures 99 are completely occupied by the nose portions 102 of the screws 100. When the screws 100 are unthreaded rearwardly, as shown at the right hand side of FIGURE 3, the nose portions 102 are substantially withdrawn from the apertures 99.

Figure 5:
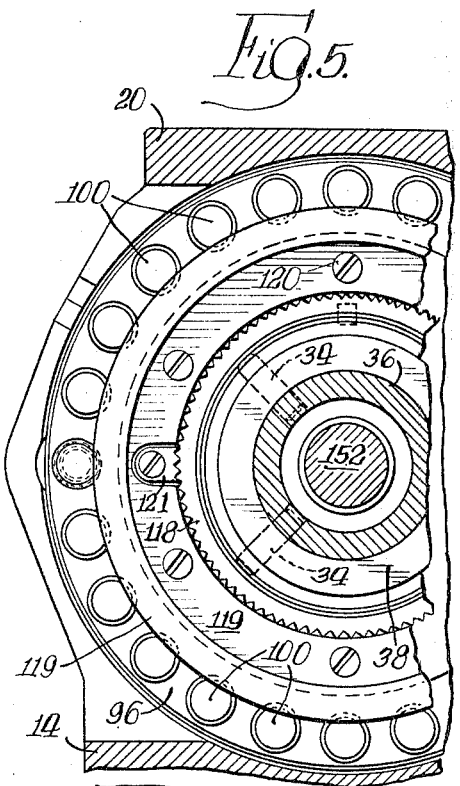
FIGURE 5 is a fragmentary transverse view, partly in section and partly in elevation, of our fixture, taken substantially along the line 5—5 in FIGURE 4, looking in the direction indicated by the arrows.

Arranged for cooperation with the indexing plate 96 is a plunger 104 which is mounted for axial sliding movement in the main body portion 16 of the housing 12 on one side thereof as shown in FIGURES 2 and 3. The plunger 104 is formed with a rear end nose portion 106 which is biased by means of a spring 108 into any aligned and unblocked aperture 99. The plunger 104 along one side is provided with rack teeth 110 that mate with the gear teeth 112 at the lower end of a vertical shaft 114 rotatably mounted in the main body portion 16 of the housing 12. The shaft 114, at the upper end thereof, extends outwardly of the housing 12 and has secured thereon an actuating handle 116. Clockwise movement of the handle 116 as viewed in FIGURE 3 effects, through interengagement of the gear teeth 112 and rack teeth 110, axial movement of the plunger 104 against the force of the spring 108 and out of engagement with the adjacent aperture 99. When the plunger 104 is disengaged from the indexing plate 96, the latter may be rotated to another indexing position. The indexing plate 96, at its forward face, bears against a vertical surface 117 of the housing 12 and is held in position by means of an externally knurled lock nut 118 thrreaded onto the rear end of the outer spindle 32. To prevent the screws 100 from becoming completely disengaged from the openings 98 when they are unthreaded rearwardly, an annular limit plate 119 is suitably secured, as by screws 120, to the rear face of the indexing plate 96. As shown in FIGURE 5, a lock nut retainer 121 is secured to the rear face of the indexing plate 96 within a cut-out in the limit plate 119. The retainer 121 is provided with a serrated edge that frictionally engages the knurled surface of the lock nut 118 to secure the latter against rotation relative to the indexing plate 96.

Figure 6:
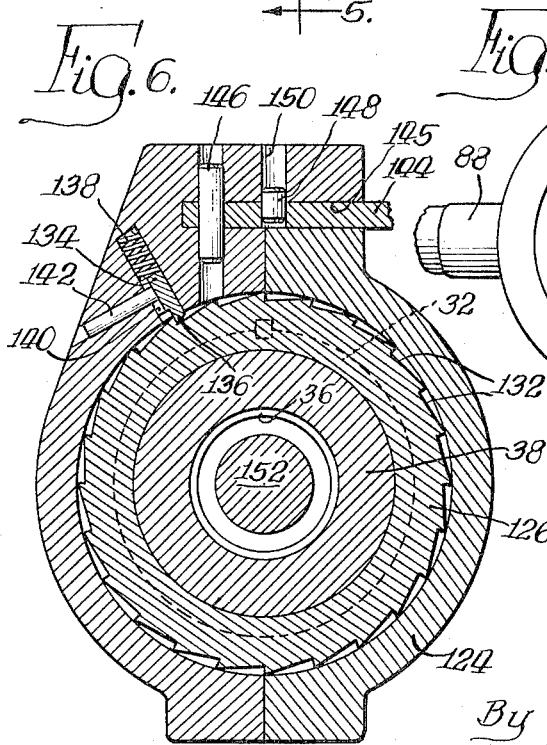
FIGURE 6 is a transverse sectional view of our fixture, taken substantially along the line 6—6 in FIGURE 1, looking in the direction indicated by the arrows.

Arranged at the forward end of the housing 12 for effecting selective rotation of the outer spindle 32 and associated structure to facilitate indexing and locating is manually operable means indicated generally by the reference numeral 122. The rotating means 122, as shown in FIGURES 1 and 6, comprises a collar member 124 which may be fabricated in two parts and which is rotatably mounted on an annular enlargement 126 provided on the outer spindle 32. The enlargement 126 at its outer periphery is formed with two axially spaced annular ridges 128 and 130 and an intermediate portion having a plurality of semi-circular dished portions 132 that serve as ratchet teeth. Slidably mounted in the collar member 124 is a ratchet pawl 134 having a radial inner end 136 flattened on one side. The pawl 134 is biased radially in the direction of the ratchet teeth 132 by means of a spring 138. The pawl 134 is also formed with a longitudinal slot 140 into which extends a fixed guide pin 142 which serves to maintain the flattened side of the end 136 in proper alignment to engage the ratchet teeth 132.

If the collar member 124 is rotated clockwise, as viewed in FIGURE 6, the end 136 of the pawl 134 rides over the ratchet teeth 132 without imparting any rotary movement to the annular enlargement 126 of the outer spindle 32. However, if the collar member 124 is rotated in a counter-clockwise direction, as viewed in FIGURE 6, when the indexing means 122 is unlocked, the flattened side of the end 136 of the pawl 134 engages the adjacent ratchet tooth 132 thereby causing the enlargement 126 and the outer spindle 32 to rotate conjointly with the collar member 124. As shown in FIGURES 1, 3 and 6, the collar member 124 is provided with a handle member 144 to facilitate rotation thereof. The handle 144 is received in the slotted portion 145 of the collar 124 and is pivotally mounted on a pin member 146 for sidewise movement about the axis thereof. Secured at one end in the handle 144 is a pin 148 that projects upwardly into a slot 150 of the collar 124 for limiting sidewise movement of the handle 144. An annular wear ring 151 is disposed about the outer spindle 32 intermediate of the forward edge of the housing body 16 and the rear face of the enlargement 126 to accommodate rotation of the spindle 32 relative to the housing.

In order to axially locate a workpiece in the collet 46, a spacer plug 152 is disposed coaxially within the inner spindle 38 and the sleeve member 36. The rear portion of the plug 152 is adjustably threaded in a support member 154 which, in turn, is threaded within the rear end of the sleeve member 36.

In the operation of the work holding fixture of our present invention, the handle 88 is pivoted forwardly so as to move the shift ring 72 rearwardly to the position shown in FIGURE 4. Then, a collet 46 of the required capacity is disposed in the forward end of the inner spindle 38, and the collar member 56, with the annular member 54 therein, is threaded onto the outer spindle 32 a sufficient distance to positively locate the collet 46. Next, the spacer plug 152 and support 154 are together unthreaded from the sleeve member 36, axially adjusted relative to each other to accommodate the length of the particular work piece to be gripped in the collet 46, and are threaded back into the sleeve member 36. At this time, certain of the indexing screws 100 corresponding to preselected indexing positions of the indexing plate 96 are unthreaded rearwardly so as to remove the nose portions 102 thereof from the apertures 99, and the nose portion 106 of the indexing plunger 104 is permitted to enter one of the unblocked apertures 99.

After a work piece has been placed within the collet 46 abutting the forward end of the spacer plug 152, the handle 88 is pivoted rearwardly so as to move the shift ring 72 forwardly to the position shown in FIGURE 1 which, as described, effects closing of the collet 46 to clamp the workpiece therein. The work piece is thus supported and accurately located in one indexing position for a machining operation. Upon completion of the first machining operation, the handle 116 is pivoted forwardly for disengaging the indexing plunger nose 106 from the adjacent aperture 99 in the indexing plate 96, and the handle 144 is then pivoted downwardly and back upwardly. As the handle 144 is initially moved upwardly, the indexing handle 116 is released and the plunger nose 106 is thereupon spring biased against the adjacent face of the indexing plate 96. Upward movement of the handle 144 is continued until the plunger nose 106 snaps into the next unblocked aperture 99. In this manner, the workpiece is located in a second indexing position for another machining operation. The described indexing operation may be repeated and a plurality of accurately angularly spaced machining operations performed. When machining of the work piece has been completed, the collet actuating handle 88 is pivoted forwardly to move the shift ring rearwardly whereby to permit the collet 46 to open to release the work piece. Other workpieces may then be successively positioned in the collet 46 for corresponding machining operations.

While we have shown and described what we believe to be a preferred embodiment of our present invention, it will be understood by those skilled in the art that various

We claim:

1. A work holding fixture comprising a housing having a main body portion with a bore therethrough, a hollow rotatable outer spindle extending through and outwardly beyond both ends of said bore, a hollow inner spindle axially slidable in and substantially coextensive in length with said outer spindle, said inner spindle having an inner conical surface at one end thereof and radial slots adjacent the other end thereof, a work holding device engageable with the inner conical surface of said inner spindle, collar means on said outer spindle at one end thereof and engaging said work holding device for preventing axial movement of the latter in one direction, a sleeve member at one end thereof extending into said other end of said inner spindle, radial pin members extending through said slots in said inner spindle and secured at their ends in said outer spindle and said sleeve member, and means carried by said sleeve member for moving said inner spindle axially relative to said work holding device for effecting actuation of the latter to clamp a workpiece therein.

2. A work holding fixture comprising a housing having a main body portion with a bore therethrough, a hollow rotatable outer spindle extending through and outwardly beyond both ends of said bore, a hollow inner spindle axially slidable in and substantially coextensive in length with said outer spindle, said inner spindle having an inner conical surface at one end thereof and radial slots adjacent the other end thereof, a work holding device engageable with the inner conical surface of said inner spindle, said work holding device being comprised of a plurality of radial jaw members embedded in a resilient body, collar means on said outer spindle at one end thereof and engaging said work holding device for preventing axial movement of the latter in one direction, a sleeve member at one end thereof extending into said other end of said inner spindle, radial pin members extending through said slots in said inner spindle and secured at their ends in said outer spindle and said sleeve member, a retainer member on said sleeve member at one end abutting said other end of said inner spindle and at the other end having an inclined surface, abutment means on said sleeve member axially spaced from said retainer member, a plurality of balls in engagement with said inclined surface of said retainer member and said abutment means, an axially shiftable ring member on said abutment means and having an inner recessed annular pocket, said ring in one axially operative position serving to bias said balls radially inwardly along said inclined surface of said retainer member whereby to move the latter axially away from said abutment means thereby moving said inner spindle axially relative to said work holding device for urging said jaw members radially inwardly to clamp a workpiece, and said ring member in another axial position permitting said balls to be partially received in said pocket of said ring member whereby to allow said retainer member and said inner spindle to move axially toward said abutment means in response to the force of expansion of said resilient body thereby permitting said jaw members to move radially outwardly so as to release the workpiece clamped in said work holding device.

3. A work holding fixture comprising a housing having a main body portion with a bore therethrough, a hollow rotatable outer spindle extending through and outwardly beyond both ends of said bore, a hollow inner spindle axially slidable in and substantially coextensive in length with said outer spindle, said inner spindle having an inner conical surface at one end thereof and radial slots adjacent the other end thereof, a work holding device engageable with the inner conical surface of said inner spindle, collar means on said outer spindle at one end thereof and engaging said work holding device for preventing axial movement of the latter in one direction, a sleeve member at one end thereof extending into said other end of said inner spindle, radial pin members extending through said slots in said inner spindle and secured at their ends in said outer spindle and said sleeve member, a retainer member on said sleeve member at one end abutting said other end of said inner spindle and at the other end having an inclined surface, abutment means on said sleeve member axially spaced from said retainer member, a plurality of balls in engagement with said inclined surface of said retainer member and said abutment means, an axially shiftable ring member on said abutment means and having an inner recessed annular pocket, said ring member in one axially operative position serving to bias said balls radially inwardly along said inclined surface of said retainer member whereby to move the latter axially away from said abutment means thereby moving said inner spindle axially relative to said work holding device for effecting actuation of the latter to clamp a workpiece therein, said ring member in another axial position permitting said balls to be partially received in said pocket of said ring member whereby to allow said retainer member and said inner spindle to move axially toward said abutment means thereby releasing the workpiece clamped in said work holding device, and indexing and locating means at the other end of said outer spindle for locking the latter against rotational movement in any indexed position.

4. A work holding fixture comprising a housing having a main body portion with a bore therethrough, a hollow rotatable outer spindle extending through and outwardly beyond both ends of said bore, a hollow inner spindle axially slidable in and substantially coextensive in length with said outer spindle, said inner spindle having an inner conical surface at one end thereof and radial slots adjacent the other end thereof, a work holding device engageable with the inner conical surface of said inner spindle, collar means on said outer spindle at one end thereof and engaging said work holding device for preventing axial movement of the latter in one direction, a sleeve member at one end thereof extending into said other end of said inner spindle, radial pin members extending through said slots in said inner spindle and secured at their ends in said outer spindle and said sleeve member, a retainer member on said sleeve member at one end abutting said other end of said inner spindle and at the other end having an inclined surface, abutment means on said sleeve member axially spaced from said retainer member, a plurality of balls in engagement with said inclined surface of said retainer member and said abutment means, an axially shiftable ring member on said abutment means and having an inner recessed annular pocket, said ring member in one axially operative position serving to bias said balls radially inwardly along said inclined surface of said retainer member whereby to move the latter axially away from said abutment means thereby moving said inner spindle axially relative to said work holding device for effecting actuation of the latter to clamp a workpiece therein, said ring member in another axial position permitting said balls to be partially received in said pocket of said ring member whereby to allow said retainer member and said inner spindle to move axially toward said abutment means thereby releasing the workpiece clamped in said work holding device, an indexing and locating plate secured to the other end of said outer spindle and having a plurality of axial apertures therein, an indexing plunger carried by said housing, means for selectively controlling movement of said indexing plunger into one of the apertures in said indexing plate for locking the latter against rotational movement in any indexed position, said outer spindle having ratchet teeth circumferentially spaced thereabout adjacent said one end thereof, and a manually rotatable collar member overlying said ratchet teeth and carrying a spring biased pawl that rides over said ratchet teeth during rotation of said collar member in one direction and engages one of said ratchet teeth during rotation of said collar member in the other direction when said indexing plunger is disengaged from said apertures in said indexing plate whereby to effect rotaton of said outer spindle between indexed positions.

References Cited by the Examiner

UNITED STATES PATENTS

| | | | |
|---|---|---|---|
| 2,233,858 | 3/1941 | Tree | 279—5 |
| 2,429,617 | 10/1947 | Gustafson | 269—70 |
| 2,668,719 | 2/1954 | Harmon | 279—5 |
| 2,877,691 | 3/1959 | Shurina | 279—5 |
| 3,090,633 | 5/1963 | Farnsworth | 279—5 |

FRANCIS S. HUSAR, *Primary Examiner.*